(12) United States Patent  
Qi et al.

(10) Patent No.: US 7,996,762 B2  
(45) Date of Patent: Aug. 9, 2011

(54) CORRELATIVE MULTI-LABEL IMAGE ANNOTATION

(75) Inventors: Guo-Jun Qi, Beijing (CN); Xian-Sheng Hua, Beijing (CN); Yong Rui, Sammamish, WA (US); Hong-Jiang Zhang, Beijing (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 12/030,616

(22) Filed: Feb. 13, 2008

(65) Prior Publication Data

US 2009/0083010 A1    Mar. 26, 2009

Related U.S. Application Data

(60) Provisional application No. 60/974,381, filed on Sep. 21, 2007.

(51) Int. Cl.  
*G06F 17/00* (2006.01)

(52) U.S. Cl. ........................................................ 715/233

(58) Field of Classification Search .................. 715/230, 715/231, 233, 201, 255  
See application file for complete search history.

(56) References Cited

U.S. PATENT DOCUMENTS

| | | | |
|---|---|---|---|
| 6,353,831 B1 * | 3/2002 | Gustman | 707/740 |
| 6,496,594 B1 * | 12/2002 | Prokoski | 382/118 |
| 6,516,090 B1 | 2/2003 | Lennon et al. | |
| 6,763,069 B1 | 7/2004 | Divakaran et al. | |
| 6,819,797 B1 | 11/2004 | Smith et al. | |
| 7,010,751 B2 * | 3/2006 | Shneiderman | 715/232 |
| 7,065,705 B1 * | 6/2006 | Wang et al. | 715/209 |
| 7,124,149 B2 | 10/2006 | Smith et al. | |
| 7,639,387 B2 * | 12/2009 | Hull et al. | 358/1.18 |
| 2002/0055955 A1 * | 5/2002 | Lloyd-Jones et al. | 707/512 |
| 2002/0161747 A1 * | 10/2002 | Li et al. | 707/3 |
| 2002/0161804 A1 | 10/2002 | Chiu et al. | |
| 2004/0205482 A1 | 10/2004 | Basu et al. | |
| 2004/0215663 A1 * | 10/2004 | Liu et al. | 707/104.1 |
| 2006/0053364 A1 | 3/2006 | Hollander et al. | |
| 2006/0074634 A1 | 4/2006 | Gao et al. | |
| 2006/0161867 A1 | 7/2006 | Drucker et al. | |
| 2006/0195858 A1 | 8/2006 | Takahashi et al. | |
| 2006/0239515 A1 * | 10/2006 | Zhang et al. | 382/118 |
| 2007/0047781 A1 * | 3/2007 | Hull et al. | 382/124 |
| 2007/0070069 A1 | 3/2007 | Samarasekera et al. | |
| 2007/0073745 A1 | 3/2007 | Scott et al. | |

(Continued)

FOREIGN PATENT DOCUMENTS

WO    WO2006011891 A1    2/2006

OTHER PUBLICATIONS

Belle, et al., "Ontology-Based Multi-Classification Learning for Video Concept Detection", IEEE, 2004, pp. 1003-1006.

(Continued)

*Primary Examiner* — Laurie Ries  
(74) *Attorney, Agent, or Firm* — Lee & Hayes, PLLC

(57) ABSTRACT

Correlative multi-label image annotation may entail annotating an image by indicating respective labels for respective concepts. In an example embodiment, a classifier is to annotate an image by implementing a labeling function that maps an input feature space and a label space to a combination feature vector. The combination feature vector models both features of individual ones of the concepts and correlations among the concepts.

17 Claims, 9 Drawing Sheets

Example Correlative Multi-Label Image Annotation System

U.S. PATENT DOCUMENTS

| | | | |
|---|---|---|---|
| 2007/0073749 A1 | 3/2007 | Fan | |
| 2007/0118399 A1* | 5/2007 | Avinash et al. | 705/2 |
| 2007/0239683 A1* | 10/2007 | Gallagher | 707/3 |
| 2007/0266342 A1* | 11/2007 | Chang et al. | 715/810 |
| 2008/0172383 A1* | 7/2008 | Lea et al. | 707/6 |

OTHER PUBLICATIONS

Boyd, "Convex Optimization", Cambridge University Press, 2004, pp. 1-730.

Chang, et al., "Video Search and High-Level Feature Extraction", Mar. 1, 2007, pp. 1-12.

Crammer, et al., "On the Algorithmic Implementation of Multiclass Kernel-Based Vector Machines", Koby Crammer and Yoram Singer, 2001, pp. 265-292.

Godbole, et al., "Discriminative Methods for Multi-Labeled Classification", Springer-Verlag Berlin Heidelberg, 2004, pp. 22-30.

Hauptmann, et al., "Multi-Lingual Broadcast News Retrieval", Mar. 2, 2007, pp. 1-12.

Hohlt, et al., "Active Learning for Video Annotation", available at least as early as Nov. 2, 2007, at <<http://barbara.stattenfield.org/papers/active_learning.pdf>>, pp. 4.

Joachims, "Making Large-Scale SVM Learning Practical. Advances in Kernel Methods. Support Vector Learning", 1998, pp. 41-56.

Marr, et al., "Vision", at <<http://www.cc.gatech.edu/~jimmyd/summaries/marr1982.html>>, W H. Freeman and Company, 1982, pp. 1-2.

Naphade, et al. "A Factor Graph Framework for Semantic Video Indexing", IEEE, vol. 12, No. 1, Jan. 2002, pp. 40-52.

Naphade, et al., "A Light Scale Concept Ontology for Multimedia Understanding for TRECVID 2005", pp. 1-4.

Naphade, "Statistical Techniques in Video Data Management", IEEE, 2002, pp. 210-215.

Smith, et al., "Multimedia Semantic Indexing Using Model Vectors", IEEE, 2003, pp. 445-448.

Snoek, et al., "The Challenge Problem for Automated Detection of 101 Semantic Concepts in Multimedia", ACM, 2006, pp. 1-10.

Sonek, et al., "The MediaMill TRECVID 2006 Semantic Video Search Engine", retrieved on Jan. 14, 2008, at http://66.102.9.104/search?q=cache:nS_NXb3GIJ0J:staff.science.uva.nl/~cgmsnoek/pub/m..>>, pp. 1-19.

Song, et al., "Semi-Automatic Video Annotation Based on Active Learning with Multiple Complementary Predictors", at http://delivery.acm.org/10.1145/1110000/1101844/p97-song.pdf?key1=1101844&key2=0565193911&coll=GUIDE&dl=&CFID=15151515&CFTOKEN=6184618>>, ACM, 2005, pp. 97-103.

Tong, "An Introduction to Support Vector Machines and Other Kernel-Based Learning Methods.", at <<http://www.encyclopedia.com/doc/1G1-76698534.html>>, HighBeam Research, Inc., 2008, pp. 1-7.

"TREC Video Retrieval Evaluation", retrieved at Jan. 10, 2008, at <<http://www-nlpir.nist.gov/projects/trecvid/>>, NIST, pp. 1-2.

Wang, et al., "Multi-Concept Multi-Modality Active Learning for Interactive Video Annotation", at <<http://ieeexplore.ieee.org/iel5/4338315/4338316/04338365.pdf>>, IEEE, 2007, pp. 321-328.

Wang, et al., "Optimizing Multi-Graph Learning: Towards A Unified Video Annotation Scheme", at <<http://research.microsoft.com/~xshua/publications/pdf/2007_ACMMM_OMGSSL.pdf>>, ACM, 2007, pp. 10.

Karmeshu, "Entopy Measures, Maximum Entopy Principle and Emerging Applications", Springer-Verlag, Germany, 2003, pp. 115-136.

Winkler, "Image Analysis, Random Fields and Dynamic Monte Carlo Methods: A mathmatical introduction"Springer-Verlag, Germany, 1995.

* cited by examiner

Example Correlative Multi-Label Image Annotation Method

CORRELATIVE MULTI-LABEL IMAGE ANNOTATION

CROSS-REFERENCE(S) TO RELATED APPLICATION(S)

This U.S. Nonprovisional Patent Application claims the benefit of copending U.S. Provisional Patent Application No. 60/974,381, filed on 21 Sep. 2007, and entitled "Correlative Multi-Label Video Annotation". U.S. Provisional Patent Application No. 60/974,381, is hereby incorporated by reference in its entirety herein.

BACKGROUND

Many textual documents have been made available over the internet in the past 10-20, years. Search engines are capable of indexing these textual documents based on the words that they contain. People can find a desired relevant topic with a keyword search using a search engine after the indexing has been performed. Thus, textual documents are fairly accessible over the internet.

More recently, especially in the last 5-10, years, images are increasingly being made available over the internet. For example, images, including videos, are being uploaded to websites that enable the images to be viewed and otherwise shared. It is already difficult to locate a video that addresses a desired topic, and the rate at which images are being added to the internet is increasing. In contrast with textual documents, videos often do not include a sufficiently representative set of textual words, if they include any. Consequently, it is difficult for current search engines to index or otherwise organize the vast collection of videos on the internet.

One approach to organizing videos is to annotate each video with one or more concepts. The annotated concepts can then be indexed for subsequent searching and retrieval of the associated videos. This annotation can be performed manually by people that view each video. However, manual approaches to annotating videos are time-consuming, financially untenable, and prone to inconsistencies resulting from viewers' subjectivities. Automated approaches have also been developed. These automated approaches can be significantly more efficient than manual ones and can be scaled accordingly. Unfortunately, current automated approaches to annotating videos produce many mislabeled concepts.

SUMMARY

Correlative multi-label image annotation may entail annotating an image by indicating respective labels for respective concepts. In an example embodiment, a classifier is to annotate an image by implementing a labeling function that maps an input feature space and a label space to a combination feature vector. The combination feature vector models both features of individual ones of the concepts and correlations among the concepts.

In another example embodiment, a method includes creating a concept feature modeling portion and a concept correlation modeling portion that are combined to form a combination feature vector. The concept feature modeling portion is created responsive to low-level features of an image to model connections between the low-level features of the image and individual concepts that are to be annotated, and the concept correlation modeling portion is created to model correlations among at least a subset of the concepts that are to be annotated. The method further includes solving a labeling function responsive to the combination feature vector to produce a concept label vector for the image, the concept label vector including label indicators respectively associated with the concepts that are to be annotated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, apparatus, device, media, procedure, API, arrangement, etc. embodiments are described herein.

BRIEF DESCRIPTION OF THE DRAWINGS

The same numbers are used throughout the drawings to reference like and/or corresponding aspects, features, and components.

DETAILED DESCRIPTION

1: Introduction to Correlative Multi-Label Image Annotation

Automatically annotating concepts for videos is relevant to semantic-level video browsing, search, and navigation. The research on video annotation evolved through two paradigms. The first paradigm uses binary classification to detect each individual concept in a concept set. It achieved limited success because it does not model the inherent correlations between concepts, such as urban and building concepts. The second paradigm adds a second step on top of the individual-concept detectors to fuse multiple concepts. However, its performance varies because the errors incurred in the first detection step can propagate to the second fusion step and therefore degrade the overall performance. The first paradigm of individual concept detection and annotation is introduced in Section 1.1, and the second paradigm of the two-step context based conceptual fusion (CBCF) annotation is introduced in Section 1.2.

A third paradigm of integrated feature and concept multi-label annotation is introduced in Section 1.3 and is described further below in Sections 2-4. In contrast with the first two paradigms, an example embodiment of the third paradigm simultaneously classifies concepts and models correlations among them in a single step. This integrated approach may be realized using, for instance, a correlative multi-label (CML) support vector machine (SVM). Alternative approaches to CML implementations include using it in conjunction with Boosting, graph-based, MEM, and other general or specialized concept detection mechanisms in lieu of SVM.

Generally, automatically annotating video at the semantic concept level can be investigated in the context of multimedia research. Concepts of interest may include a wide range of categories such as scenes (e.g., urban, sky, mountain, etc.), objects (e.g., airplane, car, face, etc.), events (e.g., explosion-fire, people-marching, etc.), certain named entities (e.g., person, place, etc.), and so forth.

There are two primary types of annotation processes: multi-labeling and multi-class. In a multi-labeling process, a video clip can be annotated with multiple labels. For example, a video clip can be classified as "urban," "building," and "road" simultaneously. In contrast, a multi-class annotation process labels only one concept to each video clip. Most real-world problems are addressed with multi-label annotation processes. In addition, multi-label processes are generally considered more complex and challenging than multi-class ones because multi-labeling involves non-exclusive detection and classification. Example embodiments that are described herein focus on multi-label annotation schemes.

Figure 1:
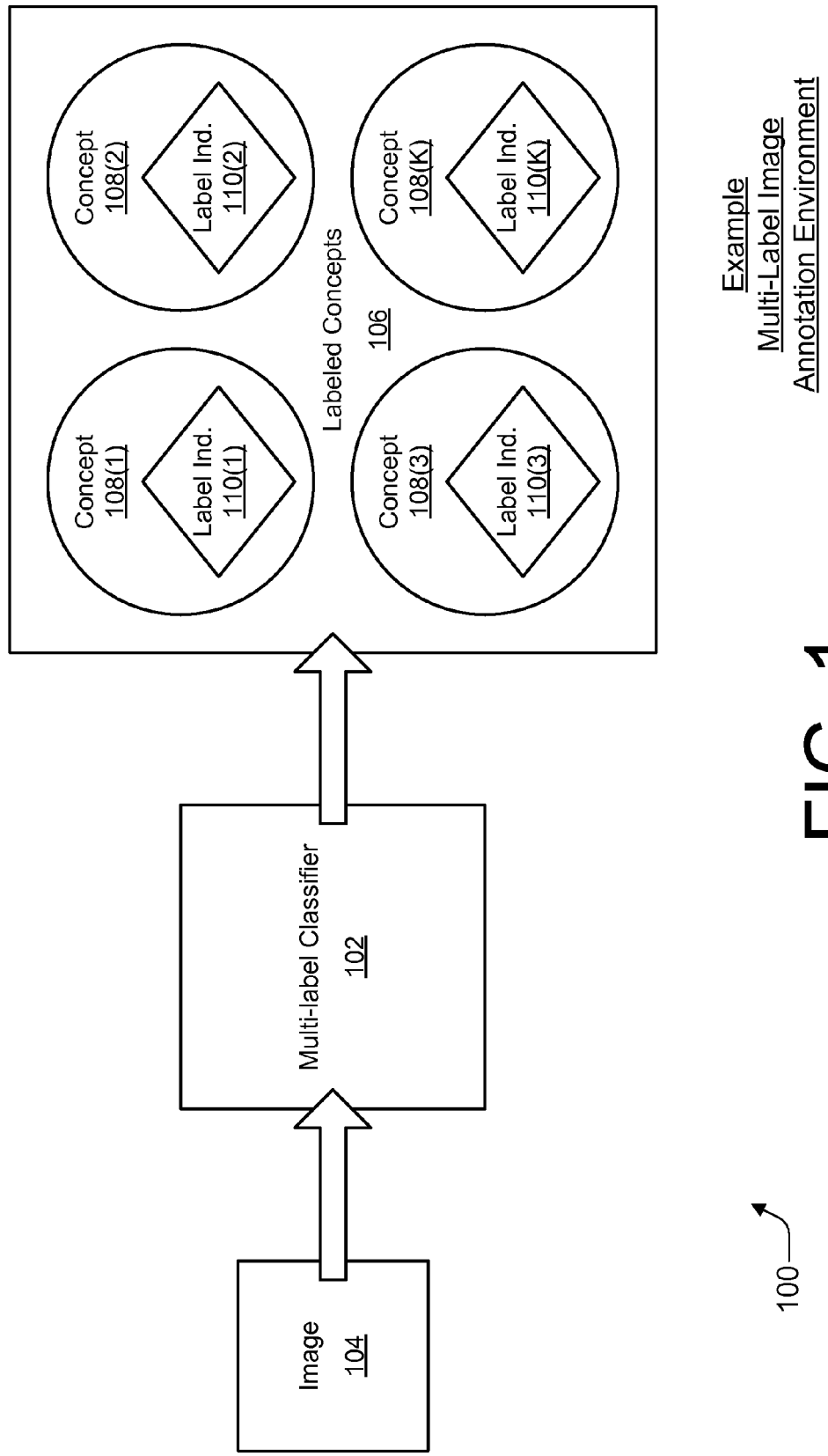
FIG. 1 is a block diagram of an example multi-label image annotation environment with a multi-label classifier in which correlative multi-label image annotation may be implemented.

FIG. 1 is a block diagram of an example multi-label image annotation environment 100 with a multi-label classifier 102 in which correlative multi-label image annotation may be implemented. As illustrated, multi-label image annotation environment 100 includes multi-label classifier 102, at least one image 104, and one or more labeled concepts 106. Multi-label environment 100 also includes multiple concepts 108 and respective multiple label indicators 110. Specifically, there are "K" concepts 108(1), 108(2), 108(3) . . . 108(K), and "K" label indicators 110(1), 110(2), 110(3) . . . 110(K), with K representing some positive integer.

Each image 104 may be a single picture, a frame of a sequence of images for a video, some combination thereof, and so forth. Without loss of generality, correlative multi-label image annotation and aspects thereof are at times referred to herein below in the context of video annotation (e.g., labeled video concepts). With labeled concepts 106, each respective concept 108 may be associated with a respective label indicator 110.

In an example embodiment, image 104 is applied to multi-label classifier 102. Multi-label classifier 102 accepts image 104 as input and performs a classification procedure to produce labeled concepts 106. Because it is a multi-label classification procedure, labeled concepts 106 include multiple concepts 108 having respective label indicators 110. For each of the multiple concepts 108, multi-label classifier 102 determines whether a particular concept 108 is applicable to the input image 104 and assigns a label indicator 110 accordingly. For example, a concept 108 may or may not be applicable to a given image 104 and thus may be assigned a relevant or a not relevant label indicator 110, respectively.

1.1: First Paradigm—Individual Concept Annotation

Figure 2:
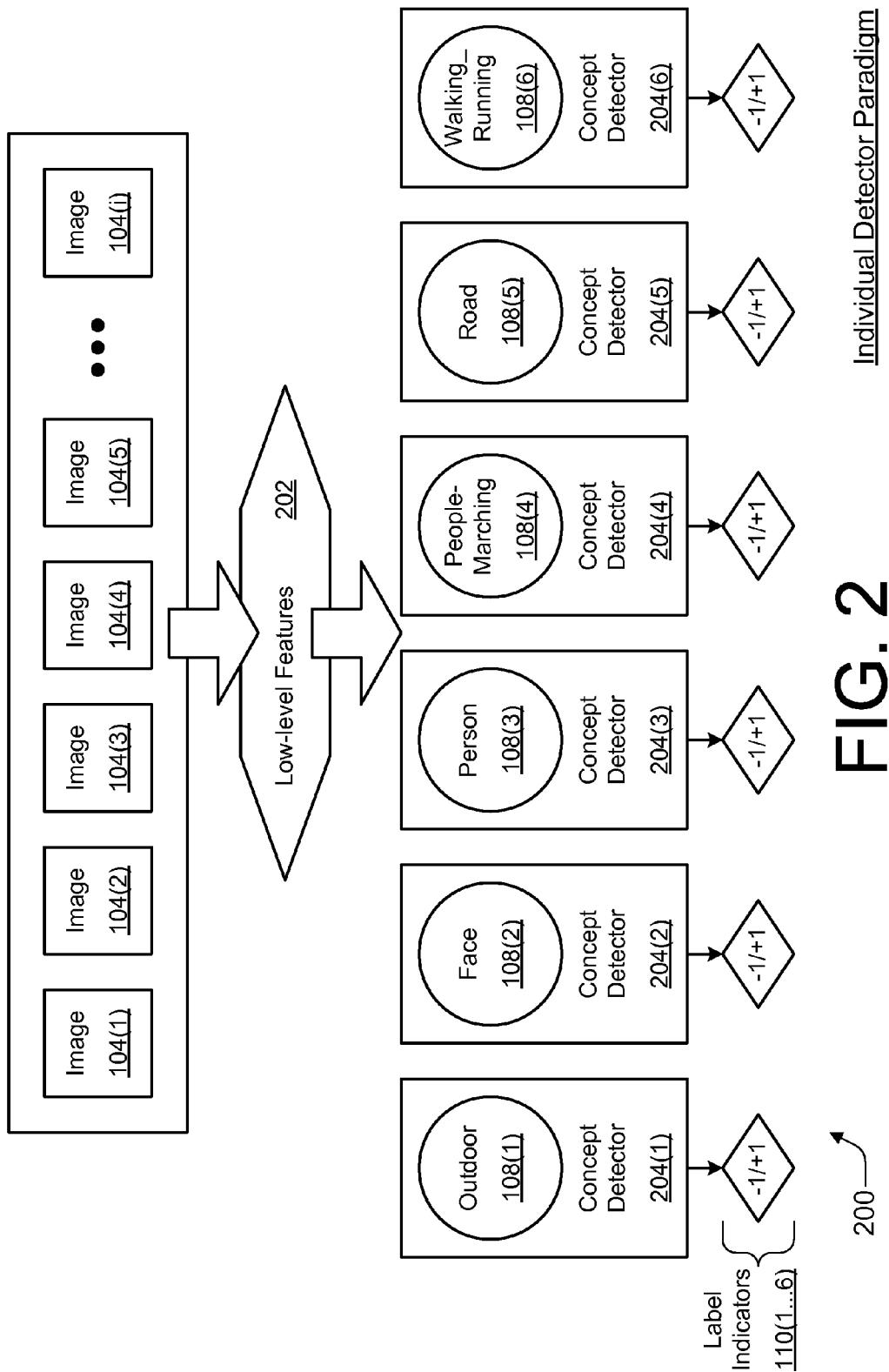
FIG. 2 is a block diagram of an individual detector paradigm for multi-label image annotation.

FIG. 2 is a block diagram of an individual detector paradigm 200 for multi-label image annotation. As illustrated, individual detector paradigm 200 includes multiple images 104, concepts 108, label indicators 110, low-level features 202, and concept detectors 204. Specifically, "i" images 104(1), 104(2), 104(3), 104(4), 104(5) . . . 104(i), with "i" being a positive integer, may be annotated. Low-level features 202 are extracted from the input image(s) 104. Examples of low-level features 202 include but are not limited to: block-wise color moment in lab color space, co-occurrence texture, wavelet texture, edge distribution layout, and so forth.

Six concepts 108(1 . . . 6) are detectable by six respective individual concept detectors 204(1 . . . 6). These six concepts are outdoor 108(1), face 108(2), person 108(3), people-marching 108(4), road 108(5), and walking running 108(6). Although six concepts 108 and six concept detectors 204 are specifically shown, more or fewer than six may be implemented. Additionally, different concepts than those six that are illustrated may alternatively be implemented. The individual concept detectors 204(1 . . . 6) output respective label indicators 110(1 . . . 6). Each indication may be relevant/present/positive or not relevant/absent/negative.

With individual detector paradigm 200, multiple video concepts 108 are detected individually and independently without considering correlations between them. That is, the multi-label video annotation is translated into a set of binary detectors 204 with presence/absence of the label being indicated 110 for each concept 108. A typical approach is to independently train a concept model using an SVM model or a maximum entropy model (MEM). Thus, individual detector paradigm 200 may be realized using a set of individual SVMs for detection 204 and annotation of video concepts 108. An equivalent mathematical alternative is to stack this set of detectors into a single discriminative classifier. However, both the individual detectors and the stacked classifier are at their cores independent binary classification formulations.

The first-paradigm approaches achieved only limited success. In the real world, video concepts do not exist in isolation. Instead, they appear correlatively, and they naturally interact with each other at the semantic level. For example, the presence of a "crowd" concept often occurs together with the presence of "people," but the concepts of "boat_ship" and "truck" do not commonly co-occur. Furthermore, although simple concepts can be modeled directly from low-level features, it is usually quite difficult to individually learn the models of certain complex concepts (e.g., "people-marching") from the low-level features alone. Instead, the complex concepts can be better inferred based on correlations with other concepts. For instance, the likelihood of the concept of "people-marching" being present can be boosted if both "crowd" and "walking_running" occurs in a video clip.

1.2: Second Paradigm—Two-Step CBCF Annotation

One approach to refining the results of the individual detectors is to implement a Context Based Concept Fusion (CBCF) strategy. Example CBCF strategies include a probabilistic Bayesian multinet approach and an ontology-based multi-classification approach. The probabilistic Bayesian multinet explicitly models the relationship between multiple concepts through a factor graph that is built upon the underlying video ontology semantics. The ontology-based multi-classification approach is learned via a training process so as to detect video concepts.

Figure 3:
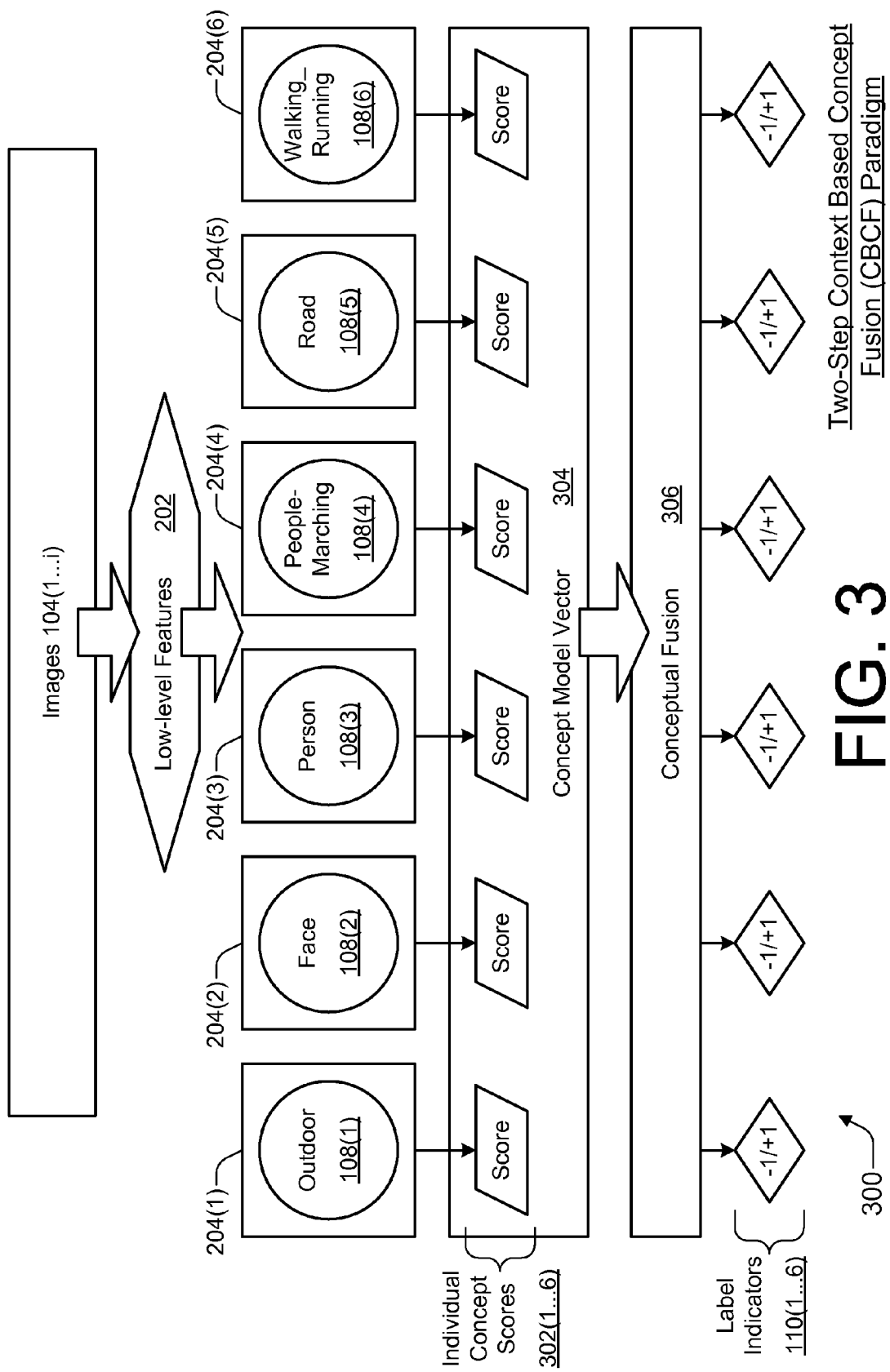
FIG. 3 is a block diagram of a two-step context based concept fusion (CBCF) paradigm for multi-label image annotation.

FIG. 3 is a block diagram of a two-step CBCF paradigm 300 for multi-label image annotation. As illustrated, CBCF paradigm 300 includes images 104(1 . . . i), low-level features 202, concepts 108, concept detectors 204, and label indicators 110. CBCF paradigm 300 also includes individual concept scores 302, a concept model vector 304, and a concept fusion mechanism 306. Generally, each respective individual concept detector 204(1 . . . 6) outputs a respective individual concept score 302(1 . . . 6) for its respective concept 108(1 . . . 6). These individual concept scores 302 are formed into concept model vector 304. Concept fusion mechanism 306 is applied to concept model vector 304 to produce respective label indicators 110(1 ... 6) for respective concepts 108(1 ... 6).

More specifically, each concept 108 is first separately modeled by an independent classifier 204, and then a predefined ontology hierarchy is investigated to improve the detection accuracy of the individual classifiers 204. A two-step Discriminative Model Fusion (DMF) approach has been proposed to mine the unknown or indirect relationships to specific concepts by constructing model vectors 304 based on detection scores 302 of individual classifiers 204. An SVM is then trained to refine the detection results of the individual classifiers 204. An alternative strategy can also be used to fuse the individual detections, such as a Logistic Regression (LR) or a CBCF-based active learning method. With a CBCF-based active learning method, users are involved to annotate a few concepts for extra video clips, and these manual annotations are then utilized to help infer and improve detections of other concepts.

Although it is intuitively correct that contextual relationships can help improve the detection accuracy of individual detectors, experiments with the above-identified CBCF approaches have shown that such improvement is not always stable. In fact, the overall performance can actually be worse than individual detectors alone. This unstable performance "gain" can be due to either or both of the following two reasons.

First, CBCF methods are built on top of the individual independent binary concept detectors with a second step to fuse them. However, the output of the individual independent detectors can be unreliable; therefore, their detection errors can propagate to the second fusion step. As a result, the final annotating label indications can be corrupted by these incorrect predictions. From a philosophical point of view, the CBCF approaches do not follow the Principle of Least-Commitment because they are prematurely committed to irreversible individual predictions in the first step which may or may not be corrected in the second fusion step.

Second, there is often insufficient data for the conceptual fusion step. With CBCF methods, the samples are split into two parts for each step. The samples for the second step of conceptual fusion are usually insufficient compared to the samples used in the first training step. Unfortunately, the correlations between the concepts are usually complex, and insufficient data can lead to "over fitting" in the fusion step. Consequently, the obtained predictions may be incapable of being reliably generalized.

1.3: Third Paradigm—Integrated Feature-Correlation Multi-Label Annotation

In contrast with the individual detector paradigm and the two-step CBCF paradigm introduced above, an integrated multi-label annotation paradigm is described herein. Example embodiments of this integrated feature-correlation paradigm simultaneously model both the individual concepts and their correlative interactions in a single formulation.

Figure 4:
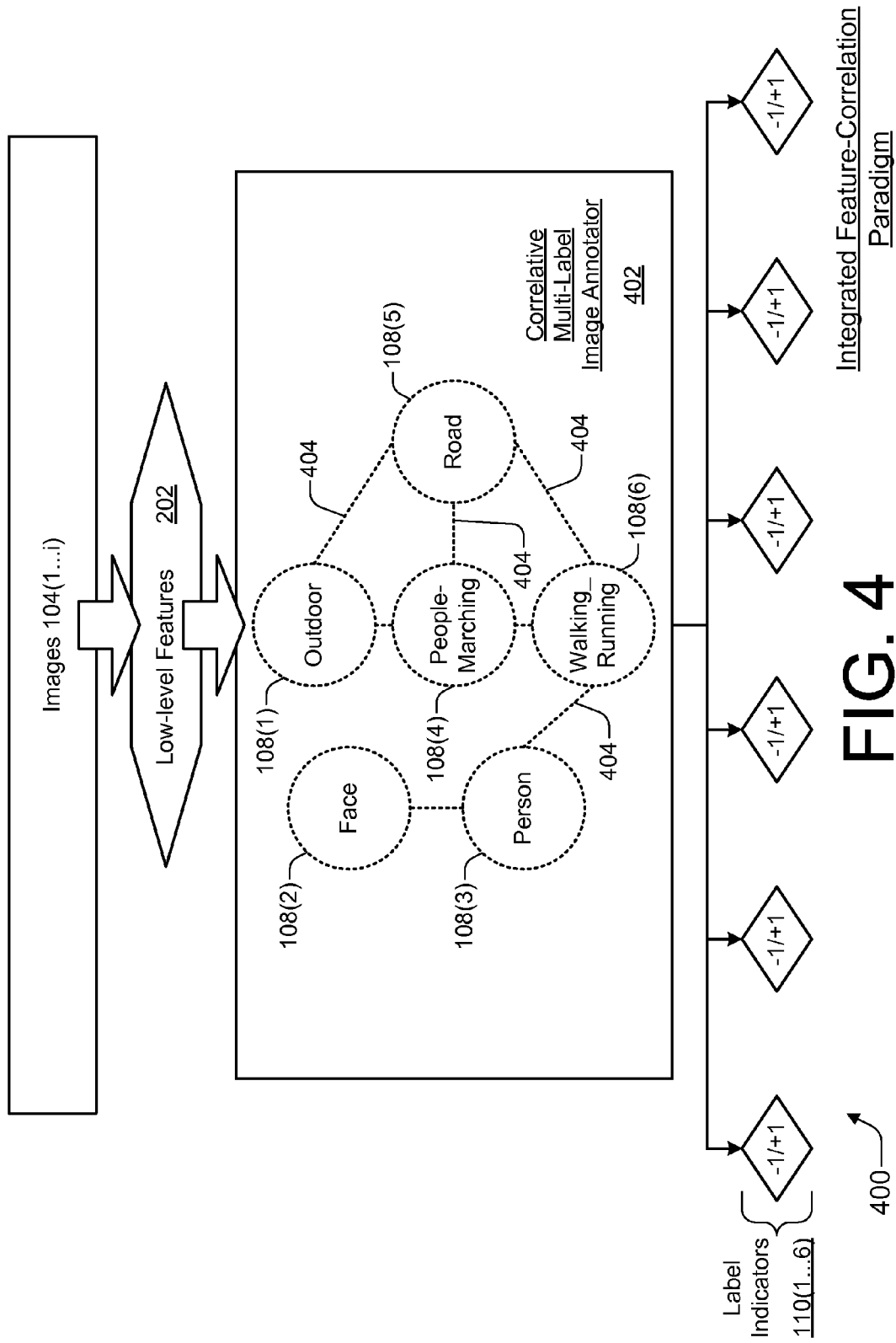
FIG. 4 is a block diagram of an example integrated feature-correlation paradigm for correlative multi-label image annotation that includes a correlative multi-label image annotator.

FIG. 4 is a block diagram of an example integrated feature-correlation paradigm 400 for correlative multi-label image annotation that includes a correlative multi-label image annotator 402. As illustrated, integrated feature-correlation paradigm 400 includes images 104(1 ... i), low-level features 202, concepts 108(1 ... 6), and label indicators 110(1 ... 6). Integrated feature-correlation paradigm 400 also includes correlative multi-label image annotator 402 and multiple correlations 404.

In an example embodiment, low-level features 202 are extracted from one or more images 104. Low-level features 202 are applied to correlative multi-label image annotator 402. Correlative multi-label image annotator 402 thus accepts as input low-level features 202. It also accepts as input multiple correlations 404 among two or more concepts 108. (For the sake of visual clarity, only a portion of the correlations that are illustrated in FIG. 4 are indicated by the reference numeral "404".) Based on concept features and concept correlations 404 that are considered simultaneously (e.g., in a single step or formulation), correlative multi-label image annotator 402 produces label indicators 110. Specifically, respective label indicators 110(1 ... 6) represent the presence or absence of respective concepts 108(1 ... 6). It should be understood that this approach models concepts and correlations simultaneously; hence, the dashed-line graph of FIG. 4 need not be explicitly built during the annotation process.

Certain example embodiments for correlative multi-label image annotation as described herein embrace the following two attributes. First, certain embodiments adhere to the Principle of Least-Commitment. Because the learning and optimization are performed in a single step for each of the concepts simultaneously, the error propagation problem created by the two-step paradigm (e.g., by CBCF) can be avoided. Second, the entirety of the samples can be efficiently used simultaneously when modeling the individual concepts as well as their correlations. The risk of over-fitting due to the unavailability of sufficient samples when modeling the conceptual correlations as occurs with the two-step paradigm is therefore significantly reduced.

To summarize, the first paradigm does not address concept correlations. The second paradigm attempts to address this deficiency by introducing a second and separate correlation step. With the third paradigm, on the other hand, the issue of concept correlations may be addressed at the root in a single step. In Section 2 below, example embodiments for CML are described from a mathematical perspective. This description includes an example classification model and an example learning strategy. In Section 3, an example approach for implementing CML using a Gibbs Random Fields (GRFs) representation is described. The GRF implementation can also provide an intuitive interpretation as to how example CML embodiments capture the individual concepts as well as the conceptual correlations. Section 4 addresses example implementation issues, including concept label vector prediction and concept scoring. Section 5 describes an example device that may be used to realize embodiments for correlative multi-label image annotation.

Other general and specific example embodiments are described herein below. Although certain example aspects may be described in a given context of specific hardware and/or software, such description is by way of example only. Thus, the example embodiments described herein may be implemented fully or partially in hardware, software, firmware, fixed logic circuitry, combinations thereof, and so forth.

2: Example Embodiments for Correlative Multi-Label Image Annotation

In this section, example embodiments for correlative multi-labeling (CML) models for image, including video image, semantic annotation are described. In Subsection 2.1, an example mathematical formulation of the multi-labeling classification function is presented. Additionally, how this function captures the correlations among the different concepts as well as how individual concepts are related to low-level features is described. In Subsection 2.2, an example classification learning procedure for the CML model is presented. Example methods for CML image annotation are described in Subsection 2.3.

Figure 5:
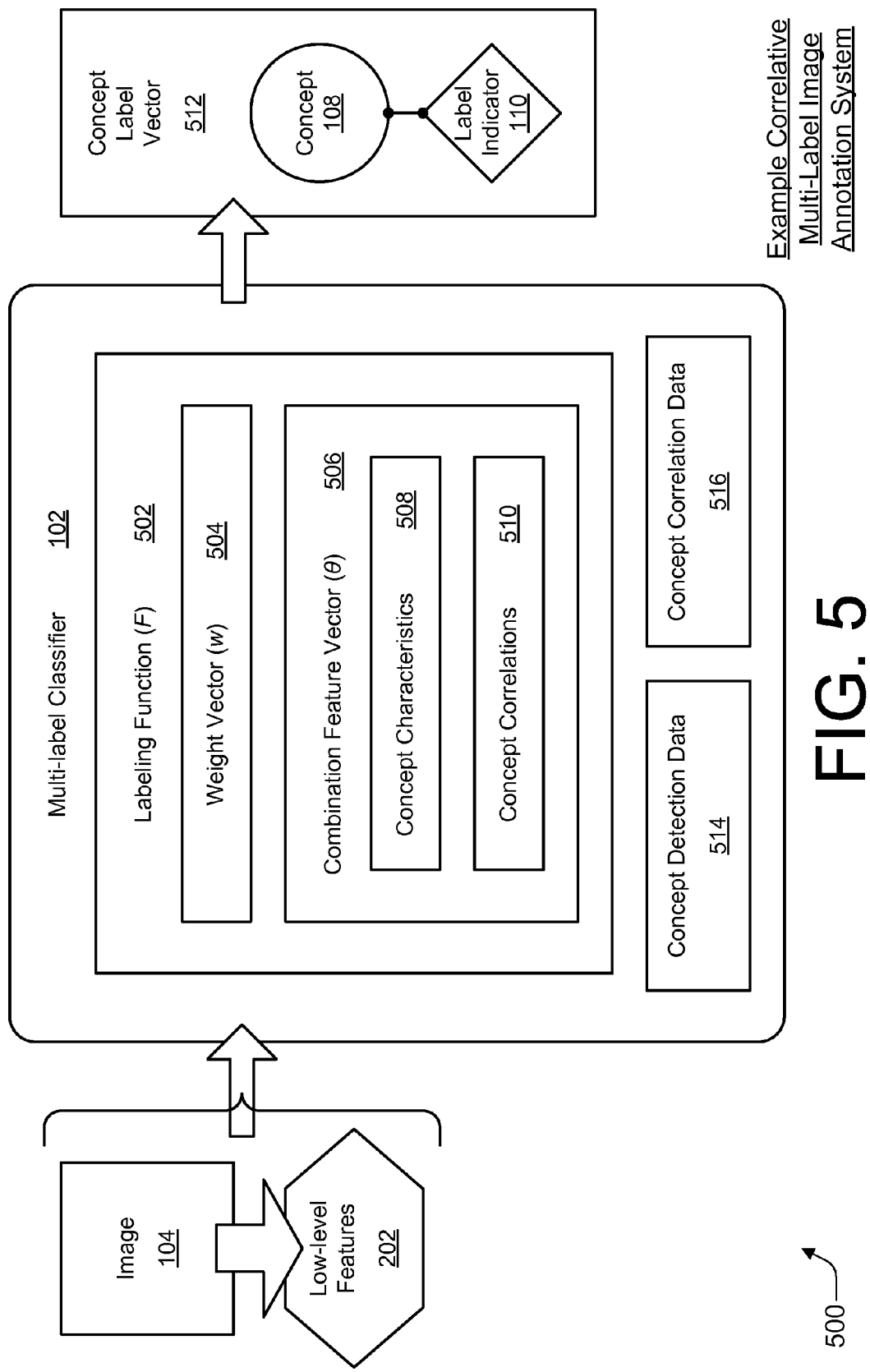
FIG. 5 is a block diagram of an example correlative multi-label image annotation system having a multi-label classifier that implements a labeling function.

FIG. 5 is a block diagram of an example correlative multi-label image annotation system 500 having a multi-label classifier 102 that implements a labeling function 502. As illustrated, correlative multi-label image annotation system 500 includes image 104, low-level features 202, and concept label vector 512, in addition to multi-label classifier 102. Multi-label classifier 102 includes labeling function 502, concept detection data 514, and concept correlation data 516. Labeling function 502 includes a weight vector 504 and a combination feature vector 506. Combination feature vector 506 includes two portions: concept characteristics 508 and concept correlations 510. Correlative multi-label image annotation system 500 may be realized, for example, using one or more devices. An example device is described herein below in Section 5 with particular reference to FIG. 9.

In an example embodiment, low-level features 202, which are extracted from image 104, are applied to multi-label classifier 102. Alternatively, a multi-label classifier 102 may be capable of extracting low-level features 202 from an input image 104. Multi-label classifier 102 evaluates labeling function 502 given low-level features 202, concept detection data 514, and concept correlation data 516 and responsive to combination feature vector 506 to produce concept label vector 512. Concept label vector 512 corresponds to labeled concepts 106 (of FIG. 1). It includes multiple concepts 108 and respectively associated label indicators 110. Formulation and evaluation of labeling function 502 are described further below in Subsections 2.1 and 2.3. An example operation of correlative multi-label image annotation system 500 is described in Section 2.3.

2.1: A Multi-Label Classification Model

Example embodiment(s), especially with regard to example mathematical formulations, for a multi-label classification model are described in this subsection. References are made to correlative multi-label image annotation system 500 of FIG. 5 by way of example. Let $x=(x_1, x_2, \ldots, x_D)^T \in X$ denote the input pattern representing feature vectors (e.g., low-level features 202) extracted from video clips or other images. Let $y \in Y=\{+1,-1\}^K$ denote the K dimensional concept label vector (e.g., concept label vector 512) of an example image (e.g., image 104), in which each entry $y_i \in \{+1,-1\}$ of y indicates the membership (e.g., label indicator 110) of this example image in the $i^{th}$ concept (e.g., concept 108). X and Y represent the input feature space and label space, respectively, of the data set.

An algorithm aims at learning a labeling function (e.g., labeling function 502), such as—without loss of generality—a linear discriminative function, as given by Eqn. (1):

$$F(x,y;w) = \langle w, \theta(x,y) \rangle, \qquad (1)$$

where $\theta(x, y)$ is a vector function mapping from $X \times Y$ to a new combination feature vector (e.g., combination feature vector 506) and w is the linear combination weight vector (e.g., weight vector 504). With such a discriminative function, for an input pattern x, the output label vector y* (e.g., concept label vector 512) can be predicted by maximizing over the argument y as shown by Eqn. (2):

$$y^* = \max_{y \in Y} F(x, y; w). \qquad (2)$$

As is described in the following Section 3, such a discriminative function can be intuitively understood with a GRF framework when considering the following defined feature vector $\theta(x, y)$. The constructed combination feature $\theta(x, y)$ is a high-dimensional feature vector whose elements can be partitioned into two portions of two types: concept characteristics and concept correlations. As is explained further herein below, these two types of elements account for the modeling of individual concepts and their correlative interactions, respectively. The types 1 and 2 of the first and second portions, respectively, are described below.

Type 1—The elements for the concept feature modeling portion (e.g., concept characteristics portion 508) of the combination feature vector are given, by way of example, via Eqn. (3):

$$\theta^l_{d,p}(x, y) = x_d \cdot \delta[\![y_p = l]\!], \qquad (3)$$

$$l \in \{+1, -1\}, 1 \le d \le D, 1 \le p \le K,$$

where $\delta[\![y_p=l]\!]$ is an indicator function that takes on the value 1 if the prediction $y_p=l$ is true and that takes on the value 0 otherwise (e.g., if the prediction $y_p=l$ is false). The variables D and K, which set the ranges of the subscript variables d and p, are the dimensions of the low level feature vector space X and the number of the concepts, respectively. Thus, the features of the first type model individual concepts. As formulated above, it is actually a third-order tensor in which the three indices are: label, denoted by l; feature, denoted by d; and concept, denoted by p. When this first type is used, it may be treated as a vector by lining up each of its entries. A tensor, or vector, is utilized by way of example because this conversion can model each of the concepts at the same time.

These entries of the concept feature modeling portion of the combination feature vector $\theta(x, y)$ serve to model the connection between the low level feature x and the labels $y_k$ of the concepts. In an example implementation, they may have functionality that is similar to traditional models (e.g., SVM, Boosting, graph-based, MEM, a combination thereof, etc.) that map from relatively low-level features to relatively high-level concepts. However, as is explained herein above, it is insufficient for a multi-labeling algorithm to account only for modeling the connections between the concept labels and the low-level features without considering the semantic correlations among different concepts. Consequently, another element type of the combination feature vector $\theta(x, y)$ is employed to investigate the correlations among the semantic concepts, including between two or more such concepts.

Type 2—The elements for the concept correlation modeling portion (e.g., concept correlations portion 510) of the combination feature vector are given, by way of example, via Eqn. (4):

$$\theta^{m,n}_{p,q}(x, y) = \delta[\![y_p = m]\!] \cdot \delta[\![y_q = n]\!] \qquad (4)$$

$$m, n \in \{+1, -1\}, 1 \le p < q \le K,$$

where the superscript variables m and n are the binary labels (positive and negative label indicator values), and the subscript variables p and q are the concept indices of the label vector. These elements serve to capture each of the possible pairs of concepts and label indicators. Thus, the features of the second type model the correlations between each pair of labels. As formulated above, it is a fourth-order tensor, but it may also be treated as a vector when used by lining up its entries. This second portion of the combination feature vector may omit consideration of the low-level features and focus on the interdependencies of the semantic concepts. By way of example, both positive and negative relations are captured with these elements as set forth by Eqn. (4). For instance, the concepts "building" and "urban" form a positive concept pair that often do co-occur, but the concepts "computer/TV screen" and "airplane" form a negative concept pair that usually do not occur in the same image.

It should be understood that high-order correlations among these concepts can also be modeled, but doing so entails using a greater number of training samples and/or computations than for pair-wise correlations. Nevertheless, it should be noted that by some measures an order-2 model successfully trades off between model complexity and concept correlation complexity, and it achieves an appreciable improvement in concept detection performance as compared to the individual detector and the two-step paradigms introduced above.

For an example embodiment, the two types of elements 1 and 2 from Eqns. (3) and (4) above are concatenated to form the combined feature vector $\theta(x, y)$. It is apparent that the dimension of the combined feature vector $\theta(x, y)$ is $2KD + 4C_K^2 = 2K(D+K-1)$. Thus, when the variables K and D are large, the dimension of the vector $\theta(x, y)$ is extraordinary high. For example, if K=39 and D=200, the combined feature vector $\theta(x, y)$ has 18,564 dimensions. However, this vector is sparse as a consequence of the indicator function $\delta[[ \ ]]$ in Eqns. (3) and (4).

As a result, the kernel function (e.g., the dot product) between the two vectors, $\theta(x, y)$ and $\theta(\tilde{x}, \tilde{y})$, can be represented in a relatively compact form as indicated by Eqn. (5):

$$\langle \theta(x, y), \theta(\tilde{x}, \tilde{y}) \rangle = \langle x, \tilde{x} \rangle \sum_{1 \leq k \leq K} \delta[[y_k = \tilde{y}_k]] + \sum_{1 \leq p < q \leq K} \delta[[y_p = \tilde{y}_p]]\delta[[y_q = \tilde{y}_q]], \quad (5)$$

where $\langle x, \tilde{x} \rangle$ is the dot product over the low-level feature vector x and $\tilde{x}$. A Mercer kernel function $K(x, \tilde{x})$ (such as a Gaussian Kernel, a Polynomial Kernel, etc.) can be substituted for $\langle x, \tilde{x} \rangle$ as in conventional SVMs, and nonlinear discriminative functions can then be introduced with the use of these kernels. In the following Subsection 2.2, an example learning procedure for this model is described. In this description, the above compact kernel representation is used explicitly in the learning procedure instead of the original literal feature vector $\theta(x, y)$. Thus, when the classifier is learned, the kernel matrix may be employed without explicitly calculating the feature vector. Such a kernel trick is generally known in the art of machine learning. It should be noted that using features to model concept correlations and concept characteristics simultaneously enables the power of kernel machines to be leveraged for multi-label image classification.

2.2: Learning the Classifier

Example embodiment(s) for learning a classifier are described in this subsection. Generally, the misclassification error and a loss function are defined first. The empirical risk can then be obtained. The error is to be reduced, if not minimized, so as to attain an "optimal" weight vector w. In order to give the model a better generalization capability, a regularization term is added, and a slack variable is introduced. The Lagrange dual problem is solved by sequential minimal optimization, which produces an "optimal" w. Thus, the process arrives at a classification function for the classifier. The output label vector y* can be predicted by the classifier for any given input sample x by maximizing the labeling function F through the label vector space Y.

More specifically, using the combined feature vector that is constructed above in the form of its kernel representation as presented by Eqn. (5), the learning procedure trains a classification model as specified in Eqn. (1). The procedure can be understood as being analogous to the training of a conventional SVM. Given an example $x_i$ and its label vector $y_i$ from the training set $\{x_i, y_i\}_{i=1}^n$, then according to Eqns. (1) and (2), a misclassification occurs in circumstance(s) as delineated by Eqn. (6):

$$\Delta F_i(y) \triangleq F(x_i, y_i) - F(x_i, y) = \langle w, \Delta \theta_i(y) \rangle \leq 0, \forall y \neq y_i, y \in Y, \quad (6)$$

where $\Delta \theta_i(y) = \theta(x_i, y_i) - \theta(x_i, y)$. Thus, the empirical prediction risk on the training set with respect to the parameter w can be expressed as shown by Eqn. (7):

$$\hat{R}(\{x_i, y_i\}_{i=1}^n; w) = \frac{1}{n} \sum_{i=1}^n \sum_{y \neq y_i, y \in Y} l(x_i, y; w), \quad (7)$$

where $l(x_i, y; w)$ is a loss function counting the errors in accordance with Eqn. (8):

$$l(x_i, y; w) = \begin{cases} 1 & \text{if } \langle w, \Delta \theta_i(y) \rangle \leq 0, \forall y \neq y_i, y \in Y \\ 0 & \text{if } \langle w, \Delta \theta_i(y) \rangle > 0, \forall y \neq y_i, y \in Y. \end{cases} \quad (8)$$

A goal for learning the classifier is to find a parameter w that minimizes the empirical error $\hat{R}(\{x_i, y_i\}_{i=1}^n; w)$. Considering computational efficiencies, in practice, the following convex loss that upper bounds $l(x_i, y; w)$ can be used to avoid directly minimizing the step-function loss $l(x_i, y; w)$ as shown by Eqn. (9):

$$l_h(x_i, y; w) = (1 - \langle w, \Delta \theta_i(y) \rangle)_+, \quad (9)$$

where $(\cdot)_+$ is a hinge loss in classification. Correspondingly, the following empirical hinge risk that upper bounds $\hat{R}(\{x_i, y_i\}_{i=1}^n; w)$ is defined by Eqn. (10):

$$\hat{R}_h(\{x_i, y_i\}_{i=1}^n; w) = \frac{1}{n} \sum_{i=1}^n \sum_{y \neq y_i, y \in Y} l_h(x_i, y; w). \quad (10)$$

Accordingly, a regularized version of $\hat{R}_h, (\{x_i, y_i\}_{i=1}^n; w)$ can be formulated that minimizes an appropriate combination of the empirical error and a regularization term $\Omega(\|w\|^2)$ to avoid over-fitting of the learned model. This is given by Eqn. (11):

$$\min_w \{\hat{R}_h(\{x_i, y_i\}_{i=1}^n; w) + \lambda \cdot \Omega(\|w\|^2)\}, \quad (11)$$

where $\Omega$ is a strictly monotonically increasing function, and $\lambda$ is a parameter that trades off between the empirical risk and the regularizer. Such a regularization term can give some smoothness to the obtained function so that the nearby mapped $\theta(x, y)$, $\theta(\tilde{x}, \tilde{y})$ have a similar function value as $F(\theta(x, y); w), F(\theta(\tilde{x}, \tilde{y}); w)$. Such a local smoothness assumption is intuitive and can ameliorate the negative influence of the noise training data.

In practice, the above optimization problem can be solved by reducing it to a convex quadratic problem. Analogous to approaches for SVMs, by introducing a slack variable $\xi_i(y)$ for each pair $(x_i, y)$, the optimization formulation in Eqn. (11) can be rewritten as shown by Eqn. (12):

$$\min_w \frac{1}{2}\|w\|^2 + \frac{\lambda}{n} \cdot \sum_{i=1}^{n} \sum_{y \neq y_i, y \in Y} \xi_i(y) \quad (12)$$

$$\text{s.t. } \langle w, \Delta\theta_i(y)\rangle \geq 1 - \xi_i(y), \xi_i(y) \geq 0 \ y \neq y_i, y \in Y.$$

Upon introducing Lagrange multipliers $\alpha_i(y)$ into the above inequalities and formulating the Lagrangian dual according to the Karush-Kuhn-Tucker (KKT) theorem, the mathematics above are further reduced to the following convex quadratic problem (QP) of Eqn. (13):

$$\max_\alpha \sum_{i, y \neq y_i} \alpha_i(y) - \frac{1}{2} \sum_{i, y \neq y_i} \sum_{j, \tilde{y} \neq y_j} \alpha_i(y)\alpha_j(\tilde{y})\langle\Delta\theta_i(y), \Delta\theta_j(\tilde{y})\rangle \quad (13)$$

$$\text{s.t. } 0 \leq \sum_{y \neq y_i, y \in Y} \alpha_i(y) \leq \frac{\lambda}{n}, y \neq y_i, y \in Y, 1 \leq i \leq n$$

and the equality of Eqn. (14):

$$w = \Sigma_{1 \leq i \leq n, y \in Y} \alpha_i(y) \Delta\theta_i(y). \quad (14)$$

Different from those dual variables in conventional SVMs that only depend on the training data of observations and the associated label pairs $(x_i, y_i)$, $1, \leq i \leq n$, the Lagrangian duals in Eqn. (13) depend on the assignment of labels y, which are not limited to the true label of $y_i$. An iterative approach is used to find the active constraints and the associated label variable y* that most violates the constraints in Eqn. (9) as y*=arg $\max_{y \neq y_i} F(x_i, y; w)$ and $\Delta F_i(y^*) < 1$. An active set is maintained for these corresponding active dual variables $\alpha_i$, (y*), and w is optimized over this set during each iteration using commonly-available QP solvers. It should be noted that multi-label classifiers may be trained in accordance with described correlative multi-label image annotation embodiments using alternative approaches.

2.3: Example Implementations for Correlative Multi-Label Image Annotation

With reference to FIG. 5, for an example embodiment, low-level features 202 of image 104 are used to form combination feature vector 506 of labeling function 502. After training of multi-label classifier 102, concept detection data 514 defines how general low-level features are interrelated with different concepts, and concept correlation data 516 defines how different concepts are correlatively interrelated with each other. Concept characteristics portion 508 is created based at least in part on concept detection data 514 and responsive to low-level features 202. Concept correlations portion 510 is created based at least in part on concept correlation data 516 and responsive to different assignments of concept labels. Concept characteristics 508 and concept correlations 510 are combined (e.g., via concatenation) to form combination feature vector 506 of labeling function 502. Multi-label classifier 102 evaluates labeling function 502 to produce a concept label vector 512.

Figure 6:
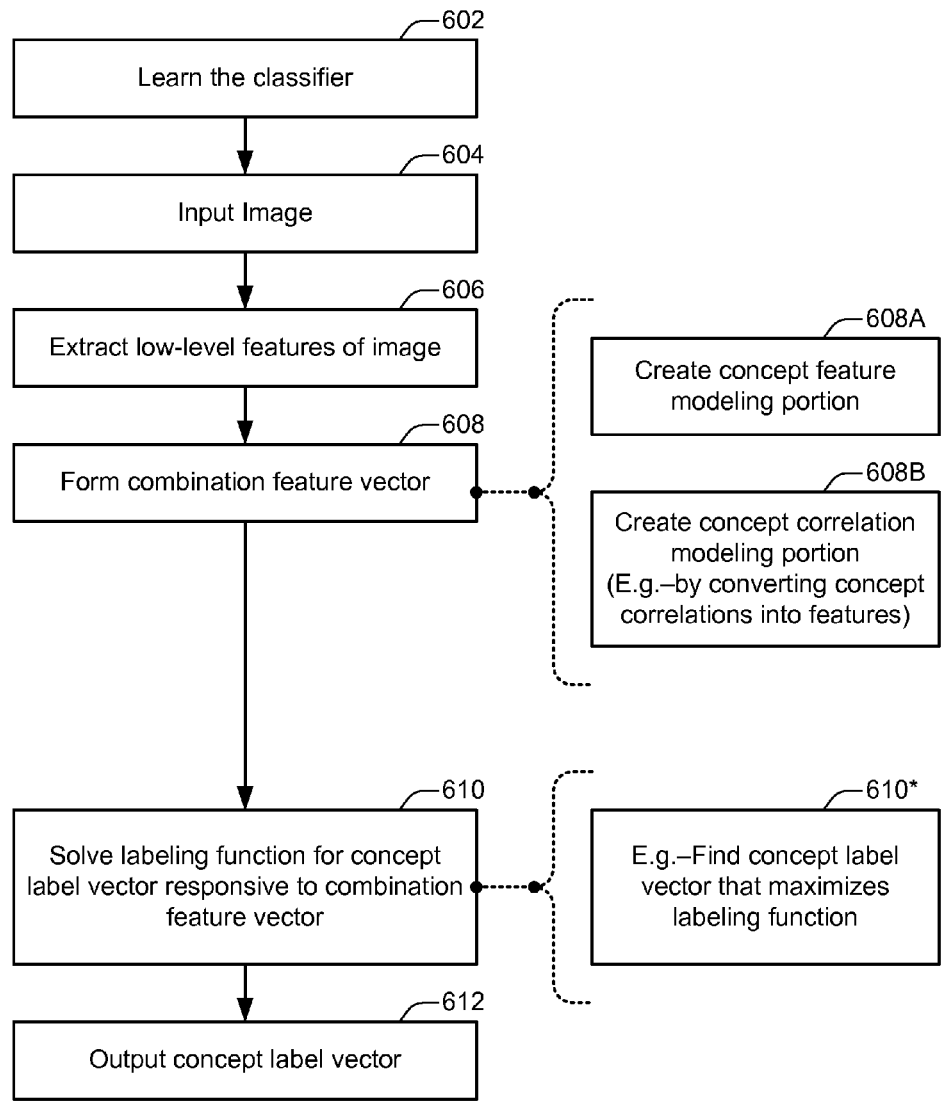
FIG. 6 is a flow diagram that illustrates an example of a method for correlative multi-label image annotation.

FIG. 6 is a flow diagram 600 that illustrates an example of a method for correlative multi-label image annotation. Embodiments of flow diagram 600 may be realized, for example, as processor-executable instructions. Processor-executable instructions may be embodied as software, firmware, hardware, fixed logic circuitry, some combination thereof, and so forth. The acts of the flow diagram(s) and scheme(s) that are described herein may be performed in many different environments, with a number of different devices, and/or in conjunction with a variety of different classification algorithms. The order in which the flow diagrams and schemes are described herein is not intended to be construed as a limitation, and any number of the described blocks can be combined, augmented, rearranged, and/or omitted to implement a respective method, or an alternative method that is equivalent thereto.

Flow diagram 600 includes nine blocks: blocks 602-612 and blocks 608A, 608B, and 610*. By way of example, the description of flow diagram 600 includes references to other figures, such as FIGS. 1, 4, and 5. In an example embodiment of flow diagram 600, at block 602, a classifier is learned. For example, a multi-label classifier 102 may be learned using the procedure described above in Subsection 2.2. Alternatively, the classifier can be learned offline such that an implementation of correlative multi-label image annotation does not entail the classifier learning of block 602.

At block 604, an image is input to the classifier. For example, an image 104 may be input to multi-label classifier 102. At block 606, low-level features of the image are extracted. For example, low-level features 202 may be extracted from image 104. The extraction may be performed by multi-label classifier 102 or another processing component involved in the correlative multi-label image annotation method. If another processing component performs the extraction, the extracted low-level features 202 may be provided to multi-label classifier 102.

At block 608, a combination feature vector is formed. For example, a combination feature vector 506 for a labeling function 502 of multi-label classifier 102 may be formed. An example implementation of the action(s) of block 608 may be further described with reference to blocks 608A and/or 608B.

At block 608A, a concept feature modeling portion is created. For example, a concept characteristics portion 508 of combination feature vector 506 may be created. For instance, concept characteristics 508 may be created in accordance with Eqn. (3) above. At block 608B, a concept correlation modeling portion is created. For example, a concept correlations portion 510 of combination feature vector 506 may be created by converting correlations among concepts into features. For instance, concept correlations 510 may be created in accordance with Eqn. (4) above.

At block 610, a labeling function is solved to attain a concept label vector responsive to the combination feature vector. For example, labeling function 502 may be evaluated to attain concept label vector 512 responsive to combination feature vector 506. An example implementation of the action(s) of block 610 may be further described with reference to block 610*.

At block 610*, the concept label vector that maximizes the labeling function may be found. For example, a concept label vector 512 that returns a relatively high value for labeling function 502 may be found. In other words, it may be computationally impractical to precisely and explicitly solve for the maximizing concept label vector. However, this maximum concept label vector may be estimated. Example approaches to such estimations are described herein below in the context of using GRFs, but other approaches may be implemented. Other approaches to solving a labeling classification function include, by way of example but not limitation, an exhaustive search of the whole space, a heuristic search (e.g., using a genetic algorithm, etc.), some combination thereof, and so forth.

At block 612, the concept label vector is output. For example, concept label vector 512 may be output by multi-label classifier 102. Concept label vector 512 may be stored in memory, presented (e.g., displayed, printed, etc.) to a user, and/or transmitted to another device. Concept label vector 512 may be further analyzed and/or used as part of another procedure, such as in conjunction with the indexing of images, providing search results, and so forth.

3: Using Gibbs Random Fields (GRF) for Multi-Label Representation

In this section, example embodiment(s) for implementing correlative multi-label image annotation using Gibbs Random Fields (GRFs) are described. This GRF representation also provides an intuitive interpretation of certain embodiments for the correlative multi-labeling image annotation model.

Eqn. (1) can be rewritten as Eqns. (15) and (16) below:

$$F(x, y; w) = \langle w, \theta(x, y) \rangle \quad (15)$$
$$= \sum_{p \in P} D_p(y_p; x) + \sum_{(p,q) \in N} V_{p,q}(y_p, y_q; x)$$

and $$D_p(y_p; x) = \sum_{1 \leq d \leq D, l \in \{+1,-1\}} w_{d,p}^l \theta_{d,p}^l(x, y) \quad (16)$$

$$V_{p,q}(y_p, y_q; x) = \sum_{m,n \in \{+1,-1\}} w_{p,q}^{m,n} \theta_{p,q}^{m,n}(x, y),$$

where $P = \{i | 1 \leq i \leq K\}$ is a finite index set of the concepts with each $p \in P$ representing a video or other image concept, and $N = \{(p, q) | 1 \leq p \leq q < K\}$ being the set of interacting concept pairs. From the GRFs point of view, $P$ is the set of sites of a random field, and $N$ is the set of adjacent sites of the concepts.

Figure 7:
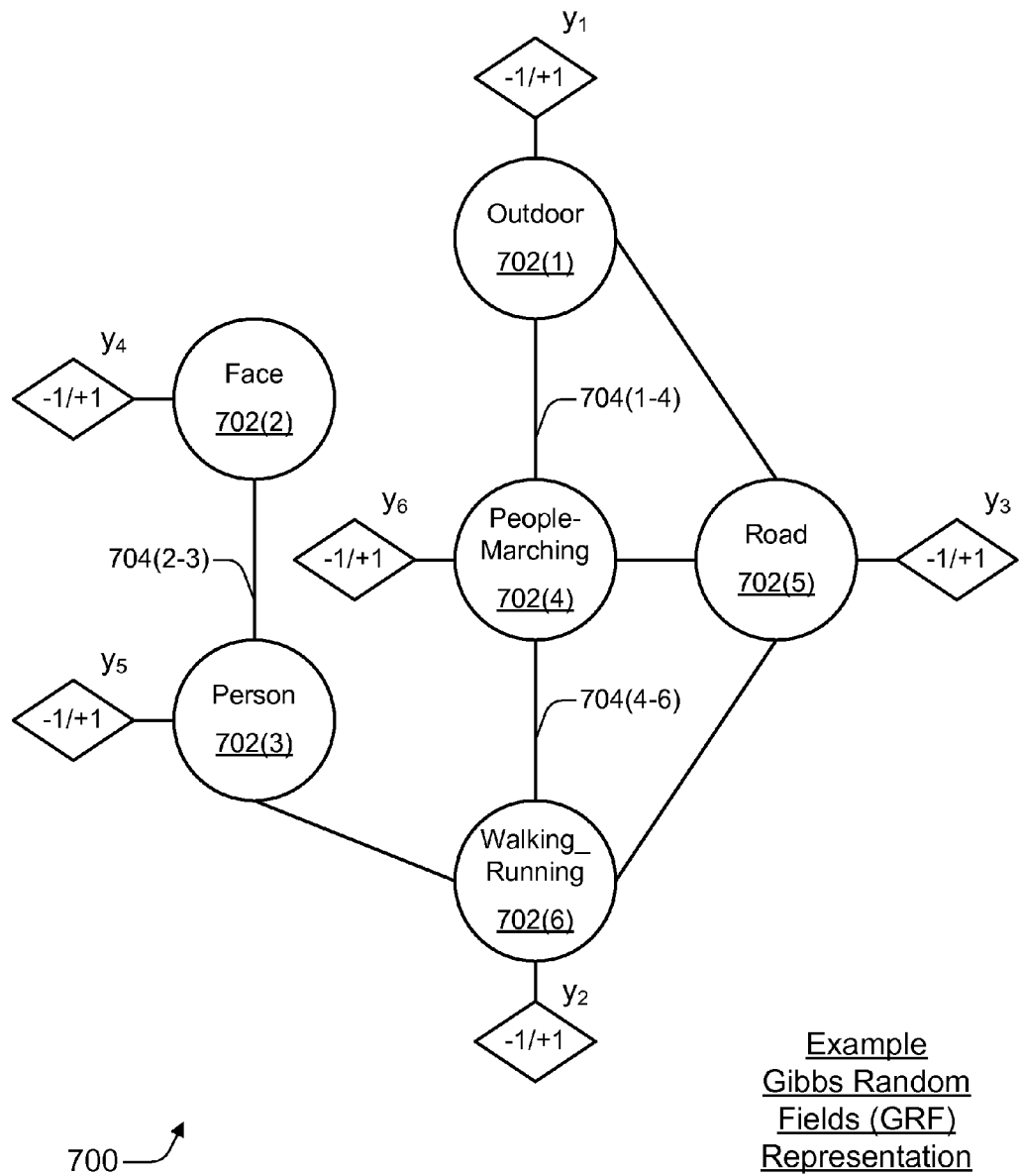
FIG. 7 is a block diagram of an example Gibbs Random Field (GRF) representation that may be used to implement correlative multi-label image annotation.

FIG. 7 is a block diagram of an example GRF representation 700 that may be used to implement correlative multi-label image annotation. As illustrated, the corresponding GRF representation 700 includes six sites 702(1 . . . 6) representing the following respective concepts: "outdoor," "face," "person," "people-marching," "road," and "walking_running." These GRF sites 702 are interconnected by edges 704 that represent concept interactions, such as (outdoor, people-marching) 704(1-4), (face, person) 704(2-3), (people-marching, walking_running) 704(4-6), etc. that are included in the neighborhood set N of GRF. In the CML framework, the corresponding N includes each of the pairs of concepts; hence, this GRF can have a fully connected structure.

The energy function for GRF given an example x can be defined in accordance with Eqn. (17):

$$H(y | x, w) = -F(x, y; w) \quad (17)$$
$$= -\left\{ \sum_{p \in P} D_p(y_p; x) + \sum_{(p,q) \in N} V_{p,q}(y_p, y_q; x) \right\}.$$

Thus, the probability measure for a particular concept label vector y given x may take the form of Eqn. (18):

$$P(y | x, w) = \frac{1}{Z(x, w)} \exp\{-H(y | x, w)\}, \quad (18)$$

where $Z(x, w) = \sum_{y \in Y} \exp\{-H(y|x, w)\}$ is the partition function.

Such a probability function with an exponential form can express a wide range of probabilities that are strictly positive over the set Y. It can be seen that when inferring the best label vector y, maximizing $P(y|x, w)$ according to the MAP criterion is equal to minimizing the energy function $H(y|x, w)$ or equivalently maximizing $F(x, y; w)$, which is in accordance with Eqn. (2) above. Therefore, certain embodiments of correlative multi-label image annotation may be implemented using a GRF representation.

Based on this GRF representation for multi-labeling image concepts, the CML model can be interpreted probabilistically in a natural intuitive manner. By substituting Eqn. (17) into Eqn. (18), the following Eqn. (19) is produced:

$$P(y | x, w) = \frac{1}{Z(x, w)} \prod_{p \in P} P(y_p | x) \cdot \prod_{(p,q) \in N} P_{p,q}(y_p, y_q | x), \quad (19)$$

where $P(y_p|x) = \exp\{D_p(y_p;x)\}$ $P_{p,q}(y_p, y_q|x) = \exp\{V_{p,q}(y_p, y_q;x)\}.$ With this formulation, $P(y|x, w)$ is factored into two types of multipliers. The first multiplier type, $P(y_p|x)$, accounts for the probability of a label $y_p$ for the concept p given x. These factors model the relations between the concept label and the low-level feature x. It should be noted that $P(y_p|x)$ corresponds to the first type 1 of the constructed features from Eqn. (3). It demonstrates that the first type of the elements in the combined feature vector $\theta(x, y)$ serves to capture the connections between x and the individual concept labels. A similar analysis can be applied to the second type of the multipliers, $P_{p,q}(y_p, y_q|x)$. These factors model the correlative interrelations between the different concepts. This second type of the multipliers thus demonstrates that the constructed features of the second type 2 from Eqn. (4) above account for the correlations among the concept labels.

The description and explanation in this section of a GRF representation further illuminates the applicability of certain aspects of the described CML embodiments, including the corresponding constructed combination feature vector $\theta(x,y)$ for the multi-labeling problem of image semantic annotation. In the following section, additional CML description is given in the context of an example GRF representation.

4: Example Implementations for Correlative Multi-Label Image Annotation

In this section, example implementations for embodiments of correlative multi-label image annotation are described. These implementations pertain to thresholding correlation values of interacting concepts (in Subsection 4.1), concept label vector prediction (in Subsection 4.2), and concept scoring (in Subsection 4.3). The interacting concepts subsection recognizes that some correlations are stronger than others. The concept label vector prediction subsection further describes the nexus between finding a concept vector for correlative multi-label image annotation and a GRF representation. The concept scoring subsection addresses how a confidence value can be associated with each labeled concept for a given image.

4.1: Thresholding Correlation Values among Interacting Concepts

In this subsection, example implementation(s) for handling different levels of correlation values for interacting concepts are described. In Section 3 above, example approaches to implementing CML algorithms using GRFs are described. As is explained in Section 3, the neighborhood set N is a collection of the interacting concept pairs. With such a straightforward GRF implementation, this set can contain up to all possible pairs for CML concept correlation analysis. However, all possible concept pairs (or other correlation sets) need not be used in an analysis.

For example, in practice some concept pairs may have rather weak interactions, including ones that are positively weak or negatively weak. For instance, the concept pairs (airplane, walking_running) and (people-marching, corporate leader) usually do not have correlations that are very strong. Based on this observation, the relatively strongly-interacted concept pairs can be focused into the set N. Accordingly, the kernel function of Eqn. (5) that may be used with CML may be modified to be as shown below in Eqn. (20):

$$\langle \theta(x,y), \theta(\tilde{x},\tilde{y}) \rangle = \langle x, \tilde{x} \rangle \Sigma_{1 \leq k \leq K} \delta[[y_k = \tilde{y}_k]] + \Sigma_{(p,q) \in N} \delta[[y_p = \tilde{y}_p]] \delta[[y_q = \tilde{y}_q]]. \quad (20)$$

The selection of concept pairs can be manually determined by experts or automatically selected by data-driven approaches. A selection process that is at least partly automatic is described below for an example implementation. First, normalized mutual information (MI) is used to measure the correlations of each concept pair (p, q). The normalized mutual information may be determined in accordance with Eqn. (21):

$$NormMI(p, q) = \frac{MI(p, q)}{\min\{H(p), H(q)\}}, \quad (21)$$

where MI(p, q) is the mutual information of the concept p and q, as defined by Eqn. (22):

$$MI(p, q) = \sum_{y_p, y_q} P(y_p, y_q) \log \frac{P(y_p, y_q)}{P(y_p) P(y_q)}, \quad (22)$$

and H(p) is the marginal entropy of concept p as defined by Eqn. (23):

$$H,(p) = -\Sigma_{y_p \in \{+1,-1\}} P(y_p) \log P(y_p). \quad (23)$$

In such an implementation, the label prior probabilities $P(y_p)$ and $P(y_q)$ can be estimated from the labeled ground-truth of the training dataset. According to information theory, the larger is the NormMI(p, q), the stronger is the correlative interaction between concept pair p and q. Such a normalized measure of concept interrelation can have the following three properties: First, it is normalized into the interval [0, 1]: $0 \leq NormMI(p,q) \leq 1$. Second, NormMI(p, q)=0 when the concept p and q are statistically independent. Third, NormMI (p, p)=1.

The above three properties are accordant with an intuitive interpretation of concept interactions, and they can be proven based on the above definitions. From the above properties, it is apparent that the normalized mutual information is scaled into the interval [0, 1] by the minimum concept entropy. With such a scaling, the normalized mutual information considers the concept correlations, regardless of whether the concepts are positively or negatively correlated.

In an example embodiment, the concept pairs whose correlations are larger than a predetermined threshold are selected for inclusion in the CML analysis using the normalized mutual information. More generally, correlations among concept sets may be subjected to a threshold. Concept sets can include two-concept sets (e.g., concept pairs), three-concepts sets, four-concept sets, and so forth. A thresholding unit to implement a predetermined threshold for correlation values among concepts is described herein below with particular reference to FIG. 8.

4.2: Concept Label Vector Prediction

In this subsection, example implementation(s) for concept label vector prediction are described. Once a classification function is obtained, the best predicted concept vector y* can be obtained from Eqn. (2). The most direct approach is to enumerate all possible label vectors in Y to find the best one. However, the size of the set Y becomes exponentially large with the incrementing of the concept number K, and thus the enumeration and evaluation of all possible concept vectors can be time-consuming with today's computational technology. For example, when K=39, the size of Y is $2^{39} \approx 5.5 \times 10^{11}$.

However, from the description of how certain CML embodiments can be implemented with GRF representations, the prediction of the best concept vector y* can be performed on the corresponding GRF form. Consequently, many popular approximate inference techniques on GRF can be adopted to predict y*, such as Annealing Simulation, Gibbs Sampling, and so forth. Specifically, these approximation techniques can be based on the output optimal dual variables $\alpha_i(y)$ in Eqn. (14). From the description in Section 3 above, the dual form of the GRF energy function of Eqn. (17) can be attained accordingly. Such a dual energy function comes from Eqn. (14). Substituting Eqn. (14) into Eqn. (1) and considering the kernel representation of Eqn. (5), the following Eqns. (24) and (25) are obtained:

$$F(\bar{x},\bar{y};w) = \langle \Sigma_{1 \leq i \leq n, y \in Y} \alpha_i(y) \Delta \theta_i(y), \theta(\bar{x},\bar{y}) \rangle = \Sigma_{p \in P} \tilde{D}_p(\bar{y}_p; x) + \Sigma_{(p,q) \in N} \tilde{V}_{p,q}(\bar{y}_p, \bar{y}_q; \bar{x}), \quad (24)$$

where $$\tilde{D}_p(\bar{y}_p; \bar{x}) = \sum_{1 \leq i \leq n, y \in Y} \alpha_i(y) k(x_i, \bar{x}) \left\{ \begin{array}{c} \delta[[y_{ip} = \bar{y}_p]] - \\ \delta[[y_p = \bar{y}_p]] \end{array} \right\} \quad (25)$$

$$\tilde{V}_{p,q}(\bar{y}_p, \bar{y}_q; \bar{x}) = \sum_{1 \leq i \leq n, y \in Y} \alpha_i(y) \left\{ \begin{array}{c} \delta[[y_i = \bar{y}_p]] \delta[[y_{iq} = \bar{y}_q]] - \\ \delta[[y_p = \bar{y}_p]] \delta[[y_q = \bar{y}_q]] \end{array} \right\}.$$

Hence, the dual energy function can be expressed as is shown in Eqn. (26):

$$\tilde{H}(\bar{y}|\bar{x}, w) = -\left\{ \sum_{p \in P} \tilde{D}_p(\bar{y}_p; \bar{x}) + \sum_{(p,q) \in N} \tilde{V}_{p,q}(\bar{y}_p, \bar{y}_q; \bar{x}) \right\}, \quad (26)$$

and the corresponding probability form of GRF can be written as shown in Eqn. (27):

$$P(\bar{y} \mid \bar{x}, w) = \frac{1}{\tilde{Z}(\bar{x}, w)} \exp\{-\tilde{H}(\bar{y} \mid \bar{x}, w)\}, \quad (27)$$

where $\tilde{Z}(\bar{x}, w) = \Sigma_{\bar{y} \in \bar{Y}} \exp\{-\tilde{H}(y|\bar{x}, w)\}$ is the partition function of the dual energy function. With the above dual probabilistic GRF formulation, the Iterated Conditional Modes (ICM) may be used for inference of y* given its effectiveness and relatively easy implementation. Other efficient approximation inference techniques of GRF (e.g., Annealing Simulation, etc.) may also be directly adopted given the above dual forms to estimate the concept label vector y*.

4.3: Concept Scoring

In this subsection, example implementation(s) are described for confidence scoring of labeled concepts. The output of certain example embodiment(s) for a CML algorithm as described herein above given a sample x is the predicted binary concept label vector y*. However, for certain applications (e.g., video retrieval applications, etc.), concept scoring can be relevant. To account for applications that may include indexing, a ranking score for each concept of each sample may be produced. With these scores, retrieved images (e.g., pictures, video clips, etc.) can be ranked according to the likelihood of a detected concept actually being relevant. By way of example, the concept scoring may be computed responsive to a conditional expectation of the label value.

For an example implementation, a ranking scoring scheme is based on the probability form, e.g., as realized by Eqn. (27). Given the predicted concept vector y*, the conditional expectation of $y_p$ for the concept p can be computed as shown by Eqns. (28), (29), and (30):

$$E(y_p|x, y^*_{P\backslash p}) = P(y_p = +1 | x, y^*_{P\backslash p}) - P(y_p = -1 | x, y^*_{P\backslash p}), \quad (28)$$

where $$P(y_p \mid x, y^*_{P\backslash p}) = \frac{\exp\{-H(y_p \circ y^*_{P\backslash p} \mid x, w)\}}{Z_p} \quad (29)$$

$$= \frac{\exp\{F(x, y_p \circ y^*_{P\backslash p}; w)\}}{Z_p}$$

and $$P(y_p \mid x, y^*_{P\backslash p}) = \sum_{y_p \in \{+1, -1\}} \exp\{-H(y_p \circ y^*_{P\backslash p} \mid x, w)\} \quad (30)$$

is the partition function on the site p. This label expectation can be used to rank images, including retrieved video clips, being returned in response to a search request for a certain concept. A conditional expectation determiner for a concept scorer is described herein below with particular reference to FIG. 8.

Figure 8:
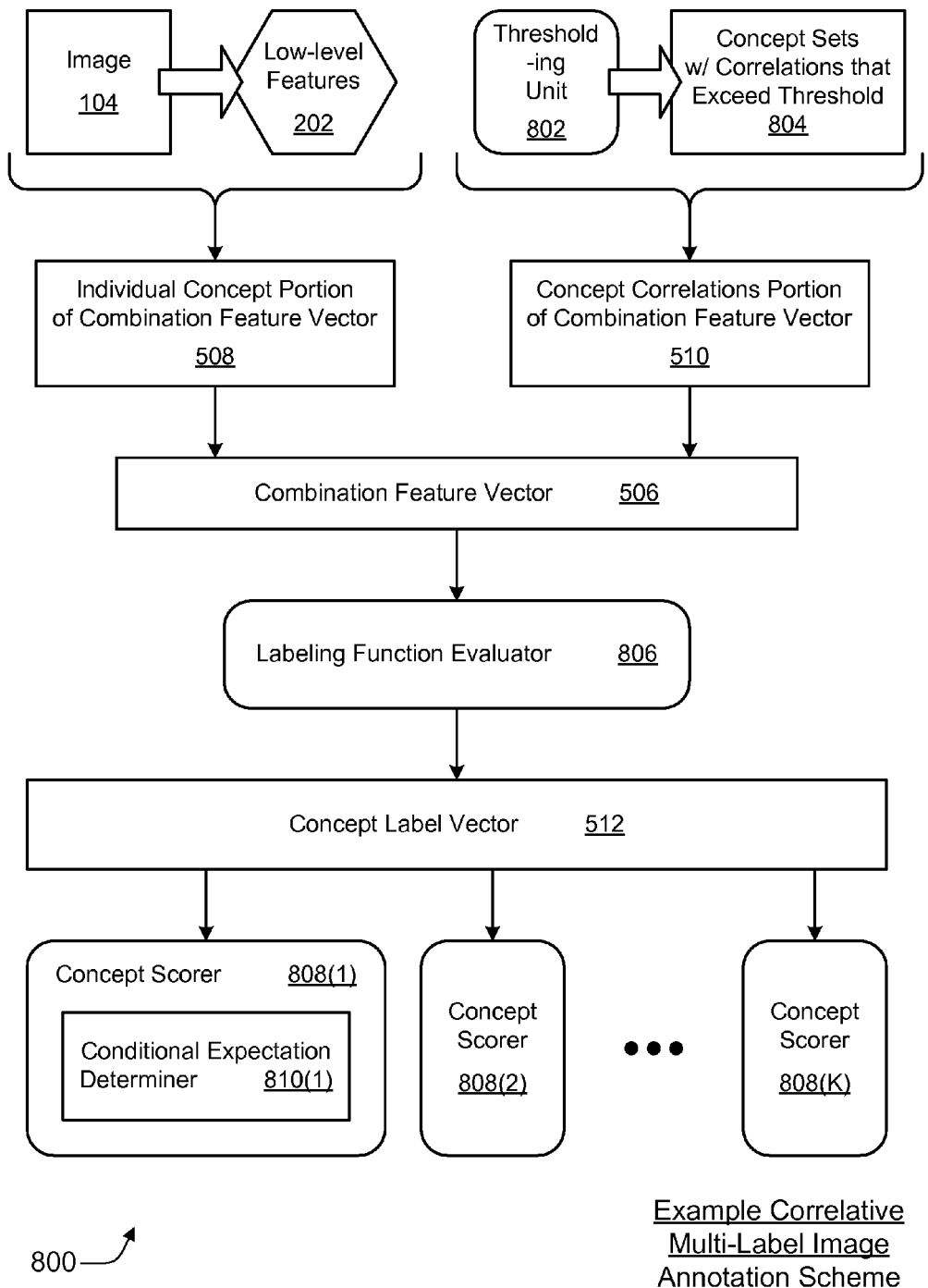
FIG. 8 is a block diagram of an example correlative multi-label image annotation scheme.

4.4: Example Correlative Multi-Label Image Annotation Schemes Including Concept Correlation Thresholding and Concept Scoring FIG. 8 is a block diagram of an example correlative multi-label image annotation scheme 800. As illustrated, correlative multi-label image annotation scheme 800 includes image 104, low-level features 202, individual concept characteristic portion 508, concept correlations portion 510, combination feature vector 506, and concept label vector 512. Correlative multi-label image annotation scheme 800 also includes thresholding unit 802, multiple concept sets with correlations that exceed a threshold 804, a labeling function evaluator 806, concept scorers 808, and conditional expectation determiners 810.

As shown, there are "K" concept scorers 808 and "K" respective conditional expectation determiners 810 that are respectively associated therewith. For the sake of clarity, only one conditional expectation determiner 810(1) is explicitly illustrated in FIG. 8. In this implementation, there is a respective concept scorer 808 and conditional expectation determiner 810 pair for each concept being labeled. However, other alternatives may be implemented. For example, a concept scorer 808 and/or a conditional expectation determiner 810 may be shared across multiple concepts. As another example, a single conditional expectation determiner 810 may be responsible for determining scores for multiple concept scorers 808.

In an example embodiment, individual concept portion 508 is created responsive to image 104 and/or low-level features 202. Concept correlations portion 510 is created responsive to thresholding unit 802 and those concept sets 804 having correlations that exceed a predetermined threshold. For example, thresholding unit 802 may use normalized mutual information (MI) to measure the correlation value strengths of each concept set, as is described herein above in Section 4.1. Those concept sets that exceed a predetermined threshold are included in thresholded concept sets 804.

Individual concept portion 508 and concept correlations portion 510 are combined to form combination feature vector 506. Labeling function evaluator 806 evaluates a labeling classification function responsive to combination feature vector 506 to estimate or otherwise produce concept label vector 512. Given the estimated or predicted concept label vector 512, a conditional expectation of a given concept label indicator for its associated concept is computed by conditional expectation determiner 810 using the expectation of the label value, as is described herein above in Section 4.3. The resulting concept score that is produced by concept scorer 808 provides an estimate of the confidence level of the label indication.

5: Example Device Implementations for Correlative Multi-Label Image Annotation

Figure 9:
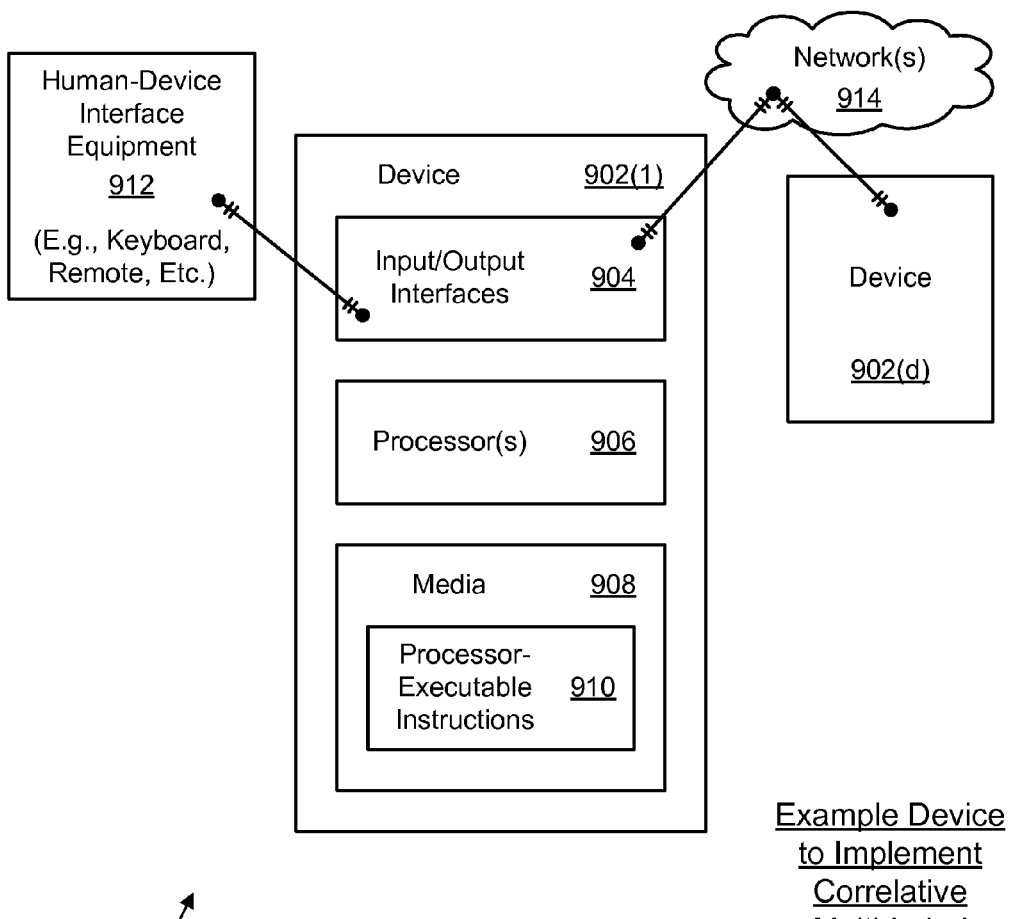
FIG. 9 is a block diagram of an example device that may be used to implement correlative multi-label image annotation.

FIG. 9 is a block diagram 900 of an example device 902 that may be used to implement correlative multi-label image annotation. As illustrated, block diagram 900 includes two devices 902(1) and 902(d), with the variable "d" in FIG. 9 representing some positive integer. Devices 902(1) and 902(d) are capable of engaging in communications via network(s) 914. Although two devices 902 are specifically shown, one or more than two devices 902 may be employed, depending on implementation. Network(s) 914 may be, by way of example but not limitation, an internet, an intranet, an Ethernet, a public network, a private network, a cable network, a digital subscriber line (DSL) network, a telephone network, a Fibre network, a Grid computer network, a wired network, an infrastructure or ad hoc wireless network, a cellular network, a mesh network, a peer-to-peer (P2P) network, an avenue to connect to any such network, some combination thereof, and so forth.

Generally, a device 902 may represent any computer or processing-capable device, such as a server device; a workstation or other general computing device; a data storage repository apparatus; a personal digital assistant (PDA); a mobile phone; a gaming platform; an entertainment device; a router computing node; a mesh or other network node; a wireless access point; some combination thereof; and so forth. As illustrated, device 902 includes one or more input/ output (I/O) interfaces 904, at least one processor 906, and one or more media 908. Media 908 include processor-executable instructions 910.

In an example embodiment of device 902, I/O interfaces 904 may include (i) a network interface for communicating across network 914, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, a screen, and so forth. Examples of (iii) human-device interfaces include those that communicate by wire or wirelessly to human-device interface equipment 912 (e.g., a keyboard, a remote, a mouse or other graphical pointing device, etc.) as well as a speaker, microphone, and so forth.

Generally, processor 906 is capable of executing, performing, and/or otherwise effectuating processor-executable instructions, such as processor-executable instructions 910. Media 908 is comprised of one or more processor-accessible media. In other words, media 908 may include processor-executable instructions 910 that are executable by processor 906 to effectuate the performance of functions by device 902. Processor-executable instructions may be embodied as software, firmware, hardware, fixed logic circuitry, some combination thereof, and so forth.

Thus, realizations for correlative multi-label image annotation may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 906 may be implemented using any applicable processing-capable technology, and one may be realized as a general purpose processor (e.g., a central processing unit (CPU), a microprocessor, a controller, etc.), a graphics processing unit (GPU), a special-purpose processor, a derivative or combination thereof, and so forth. Media 908 may be any available media that is included as part of and/or accessible by device 902. It includes volatile and non-volatile media, removable and non-removable media, storage and transmission media (e.g., wireless or wired communication channels), hard-coded logic media, combinations thereof, and so forth. Media 908 is tangible media when it is embodied as a manufacture and/or as a composition of matter. For example, media 908 may include an array of disks or flash memory for longer-term mass storage of processor-executable instructions 910, random access memory (RAM) for shorter-term storing of instructions that are currently being executed and/or otherwise processed, link(s) on network 914 for transmitting communications, and so forth.

As specifically illustrated, media 908 comprises at least processor-executable instructions 910. Generally, processor-executable instructions 910, when executed by processor 906, enable device 902 to perform the various functions described herein. Such functions include, but are not limited to: (i) those acts that are performable by the components (of FIGS. 1, 4, and/or 5); (ii) those acts that are illustrated in flow diagram 600 (of FIG. 6); (iii) those acts that are performable by the components of scheme 800 (of FIG. 8); (iv) those pertaining to a representation by and/or an evaluation of a GRF (of FIG. 7); (v) those acts that are performed to implement the algorithms and equations (e.g., equations (1), (2), (3), (4), etc.) that are described herein; combinations thereof; and so forth.

The devices, acts, aspects, features, functions, procedures, components, techniques, algorithms, etc. of FIGS. 1-9 are illustrated in diagrams that are divided into multiple blocks and other elements. However, the order, interconnections, interrelationships, layout, etc. in which FIGS. 1-9 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for correlative multi-label image annotation.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claimed invention.

What is claimed is:

1. A method for correlative multi-label image annotation, the method comprising:
   creating a concept feature modeling portion responsive to low-level features of an image to model connections between the low-level features of the image and individual concepts that are to be annotated;
   creating a concept correlation modeling portion to model correlations among at least a subset of the concepts that are to be annotated;
   forming a combination feature vector responsive to the concept feature modeling portion and the concept correlation modeling portion;
   solving a labeling function responsive to the combination feature vector to produce a concept label vector for the image, the concept label vector including label indicators respectively associated with the concepts that are to be annotated; and
   learning a classifier for the labeling function using a kernelized version of the combination feature vector that includes a dot product over at least a vector for low-level features of images to be classified.

2. The method as recited in claim 1, wherein creating the concept correlation modeling portion comprises:
   converting the correlations among at least a subset of the concepts that are to be annotated into features that may be incorporated into the combination feature vector.

3. The method as recited in claim 1, wherein the act of creating a concept correlation modeling portion comprises:
   using the subset of the concepts that are to be annotated to create the concept correlation modeling portion with the subset to include those concept sets having a correlation value that exceeds a predetermined threshold, wherein each respective correlation value is measured responsive to normalized mutual information among concepts of the respective concept set.

4. The method as recited in claim 1, further comprising:
   determining respective ranking scores for respective ones of the concepts that are to be annotated responsive to a conditional expectation of each label value to estimate a confidence level of each label indicator.

5. A system for correlative multi-label image annotation, the system comprising:
a processor; and
computer readable media that includes one or more software components that are executable by the processor, the one or more software components including:
a multi-label classifier that is executable by the processor to produce a concept label vector for an image responsive to low-level features of the image using a labeling function, the concept label vector to include multiple label indicators for multiple concepts that are to be annotated, the labeling function to include a combination feature vector having a concept characteristics portion and a concept correlations portion; the concept characteristics portion to model connections between the low-level features of the image and detection data for individual concepts, and the concept correlations portion to model correlations among at least a subset of the multiple concepts that are to be annotated, the concept characteristics portion comprising a third-order tensor having three indices representing labels, features, and concepts, and the concept correlations portion comprising a fourth-order tensor having four indices representing positive label indicator values, negative label indicator values, a first concept of each concept pair, and a second concept of each concept pair.

6. The system as recited in claim 5, wherein the subset of the multiple concepts that are to be annotated is to include those concept sets having a correlation value that exceeds a predetermined threshold, wherein each respective correlation value is measured responsive to normalized mutual information among concepts of the respective concept set; and wherein the multi-label classifier is to exclude from the concept correlations portion those concept sets having a correlation value that fails to exceed the predetermined threshold.

7. The system as recited in claim 5, further comprising:
one or more concept scorers that are executable by the processor to produce respective ranking scores for respective ones of the multiple concepts that are to be annotated, the one or more concept scorers including at least one conditional expectation determiner to determine a conditional expectation of each label value to estimate a confidence level of each label indicator.

8. A system for correlative multi-label image annotation, the system comprising:
a processor; and
computer readable media that includes one or more software components that are executable by the processor, the one or more software components including:
a classifier that is executable by the processor to annotate an image by indicating respective labels for respective concepts to implement a labeling function that maps an input feature space and a label space to a combination feature vector, the combination feature vector to model (i) features of individual ones of the concepts and (ii) correlations among the concepts, the classifier to use a kernelized version of the labeling function such that the combination feature vector is not explicitly calculated, and to evaluate the labeling function to produce a concept label vector having label indicators.

9. The system as recited in claim 8, wherein the combination feature vector is to model positive correlations and negative correlations among the concepts.

10. The system as recited in claim 8, wherein the combination feature vector is to model the correlations among the concepts using pairs of concepts.

11. The system as recited in claim 8, wherein the combination feature vector is to model high-order correlations among the concepts, with the high-order correlations corresponding to correlations among three or more concepts.

12. The system as recited in claim 8, wherein the combination feature vector is to model the features of individual ones of the concepts by modeling connections between low-level features of the image and the concepts.

13. The system as recited in claim 8, wherein the classifier is to form the combination feature vector using at least one indicator function that takes on a value of one (1) if an indicated prediction is true and a value of zero (0) if the indicated prediction is not true.

14. The system as recited in claim 8, wherein the classifier evaluates the labeling function to produce the concept label vector having the label indicators using a Gibbs Random Field (GRF) representation in which edges of the GRF representation correspond to the correlations among the concepts.

15. The system as recited in claim 8, wherein the classifier comprises a thresholding unit to ensure that the combination feature vector models those correlations among the concepts whose correlation values exceed a predetermined threshold.

16. The system as recited in claim 15, wherein each of the correlation values is measured responsive to normalized mutual information among at least two concepts.

17. The system as recited in claim 8, further comprising:
a concept scorer that is executable by the processor to provide a ranking score for a respective labeled concept based on a respective conditional expectation of a labeled value of the respective labeled concept.

* * * * *